United States Patent
Hassan et al.

(10) Patent No.: US 10,409,094 B2
(45) Date of Patent: Sep. 10, 2019

(54) OPTICAL PHASE MODULATOR WITH SINUSOIDAL PN JUNCTION

(71) Applicant: COMMISSARIAT A L'ENERGIE ATOMIQUE ET AUX ENERGIES ALTERNATIVES, Paris (FR)

(72) Inventors: Karim Hassan, Grenoble (FR); Salim Boutami, Grenoble (FR); Thomas Anfray, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/031,572

(22) Filed: Jul. 10, 2018

(65) Prior Publication Data
US 2019/0018263 A1    Jan. 17, 2019

(30) Foreign Application Priority Data

Jul. 11, 2017    (FR) ..................... 17 56576

(51) Int. Cl.
*G02F 1/025*    (2006.01)
*G02F 1/017*    (2006.01)
*G02F 1/225*    (2006.01)

(52) U.S. Cl.
CPC .......... *G02F 1/01708* (2013.01); *G02F 1/025* (2013.01); *G02F 1/2257* (2013.01); *G02F 2001/0175* (2013.01)

(58) Field of Classification Search
None
See application file for complete search history.

(56) References Cited

U.S. PATENT DOCUMENTS

| 7,085,443 B1 | 8/2006 | Gunn, III et al. |
| 7,251,408 B1 | 7/2007 | Gunn, III et al. |
| 2010/0060970 A1* | 3/2010 | Chen ............... G02F 1/025 359/245 |

(Continued)

FOREIGN PATENT DOCUMENTS

CN    105511119    4/2016

OTHER PUBLICATIONS

French Preliminary Search Report dated Mar. 12, 2018 in French Application 17 56576 filed on Jul. 11, 2017 (with English Translation of Categories of Cited Documents and Written Opinion).

(Continued)

*Primary Examiner* — Michael Stahl
(74) *Attorney, Agent, or Firm* — Oblon, McClelland, Maier & Neustadt, L.L.P.

(57) ABSTRACT

The object of the invention is a phase modulator including a modulation guide intended to guide die propagation of a light flow, said guide comprising a PN junction extending mainly along the main axis of propagation according to an oscillating continuous function. Advantageously, the oscillating continuous function is defined in such a way that the PN junction covers at least 50% of the light flow between the input and the output of the modulation guide. According to one possibility, the continuous function is sinusoidal. The object of the invention is also a switch and an intensity modulator each comprising a phase modulator.

20 Claims, 5 Drawing Sheets

(56) References Cited

U.S. PATENT DOCUMENTS

2012/0183251 A1* 7/2012 Rasigade .............. G02F 1/025
385/2
2015/0293384 A1* 10/2015 Ogawa ................... G02F 1/025
385/2

OTHER PUBLICATIONS

Chunlei Sun, et al., "On-chip switch for reconfigurable mode-multiplexing optical network," Optics Express 21722, vol. 24, No. 19, Sep. 2016, 7 Pages.

Xi Xiao, et al., "High-Speed Silicon Microring Modulator based on Zigzag PN Junction," Photonics Conference (IPC), 2012 IEEE, pp. 256-257.

Yosuke Terada, et al., "Si Photonic Crystal Slow-Light Modulators with Periodic p—n Junctions," Journal of Lightwave Technology, vol. 35, No. 9, May 2017, pp. 1684-1692.

Xinru Wu, et al., "Mode-Division Multiplexing for Silicon Photonic Network-on-Chip," Journal of Lightwave Technology, vol. 35, No. 15, Aug. 2017, pp. 3223-3228.

Daoxin Dai, et al., "Multimode Silicon Photonics Integrated Devices," 2016 IEEE International NanoElectronics Conference (INEC), May 2016, 2 Pages.

Daoxin Dai, et al., "Silicon Multimode Photonic Integrated Devices for On-Chip Mode-Division-Multiplexed Optical Interconnects," Progress in Electromagnetics Research, vol. 143, 2013, pp. 773-819.

K. Hassan, et al., "Thermo-optic plasmo-photonic mode interference switches based on dielectric loaded waveguides," Applied Physics Letters 99, 2011, pp. 241110-1-241110-3.

D. J. Thomson, et al., "High contrast 40Gbit/s optical modulation in silicon," Optics Express, vol. 19. No. 12, Jun. 2011, pp. 11507-11516.

Hui Yu, et al., "Performance tradeoff between lateral and interdigitated doping patterns for high speed carrier-depletion based silicon modulators," Optics Express, vol. 20, No. 12, Jun. 2012, pp. 12926-12938.

Zhi-Yong Li, et al., "Silicon waveguide modulator based on carrier depletion in periodically interleaved PN junctions," Optics Express, vol. 17, No. 18, Aug. 2009, pp. 15947-15958.

* cited by examiner

OPTICAL PHASE MODULATOR WITH SINUSOIDAL PN JUNCTION

TECHNICAL FIELD OF THE INVENTION

The invention relates to the field of photonics and optoelectronics. It has at least one particularly advantageous use in the field of modulators of optical signals. It has an advantageous but non-limiting use in the manufacturing of optical switches and intensity modulators, for example in the field of telecommunications.

PRIOR ART

There are several types of modulators for optical signals, in particular on a silicon chip. The modulation can be carried out either directly on the laser source, or by a dedicated electrooptical component in the circuit. Among these solutions, electrooptical modulators allow a greater bandwidth and a much higher modulation index than with direct modulation to be obtained. These components in particular allow throughputs greater than 25 Gb/s and/or modulation frequencies greater than 25 GHz to be reached.

Among these components, phase modulators have the advantage of accepting relatively high optical powers, low chromatic dispersion and low thermal drift.

A carrier-depletion phase modulator generally comprises an optical waveguide configured to confine the optical flow, and at least one section with a PN junction between a zone doped with holes (P) and a zone doped with electrons (N).

The waveguide can be configured to guide only the fundamental mode TE00 of the light wave. Alternatively, the guide can be configured to guide one or more secondary modes in addition to the fundamental mode. The guide is called single-mode if only the fundamental mode can propagate in it. It is qualified as multimode if it accepts at least two modes.

In the known solutions, the waveguide generally extends linearly. The section comprising the PN junction is generally located in the waveguide and also extends linearly in a direction parallel to the waveguide.

Such a phase modulator further comprises a device allowing a variable electric voltage V to be applied between the zones P and N.

At the PN junction, a zone depleted of carriers, called space charge region (ZCE), develops. The width $W_{ZCE}$ of this space charge region can be modulated by applying a voltage between the zones P and N.

The ZCE has in particular a refractive index different than that of the non-depleted semiconductor material. This variation in refractive index induces a phase shift of the optical wave propagating in the semiconductor material.

In fine, the light wave can thus be phase modulated by modulating the voltage between the zones P and N.

For example, the document Optical Express volume 19, issue 12, no 11507 (2011) discloses such a modulator. The PN junction develop uniformly along the axis of propagation of the light wave in the waveguide.

Such a modulator can suitably modulate the fundamental mode of a guided light wave. However, the performance of such a modulator remains limited.

One object of the present invention is therefore to propose a phase modulator having improved efficiency.

The other objects, features and advantages of the present invention will appear upon the examination of the following description and of the accompanying drawings, it is understood that other advantages can be incorporated.

SUMMARY OF THE INVENTION

To reach this goal, a first aspect of the invention relates to a phase modulator for a light flow comprising an input guide and at least one modulation guide having an input optically coupled with an output of the input guide, an output and a main axis (y) of propagation along which a light wave is intended to propagate, said guide further comprising:
 at least one N-doped zone and at least one P-doped zone in such a way as to define a PN junction generating a space charge region,
 a device configured to vary a voltage V applied between the N-doped and P-doped zones in such a way as to vary the phase of the light wave intended to propagate through the modulation guide.

Advantageously, the input guide is configured to excite various propagation modes in the modulation guide and the PN junction extends mainly along the main axis (y) of propagation, following an oscillating continuous function forming oscillations each defining a crest and in which the crests of two successive oscillations are separated by a distance $P_{jPN}$.

The excitation of various propagation modes, in particular the symmetric and asymmetric modes, allows a light flow to be obtained that results from the superposition of these modes in the modulation guide. Such a light flow advantageously has an optical power distribution in the modulation guide according to an oscillating continuous function forming oscillations each defining a crest and in which the crests of two successive oscillations are separated by a distance $P_{flux}$.

Thus, the modulator according to the invention involves a correspondence between the distribution of the light flow in a multimode guide and the space charge region (ZCE) along the main axis of propagation. The light thus interacts with the ZCE over a great length.

This arrangement provides an improved amount of overlapping between the ZCE and the light flow. The phase shift obtained by the modulation is thus greater, and the modulator becomes particularly efficient.

Moreover, with the solutions of the prior art taught by the document Optical Express volume 19, issue 12, no 11507 (2011) mentioned above, the modulator requires a modulation guide sufficiently long to effectively modulate the light wave, in particular at low voltage. This great length degrades the performance of the modulator in terms of bandwidth and complicates the control electronics.

With the solution claimed, since the amount of overlapping is improved, the length of the guide, in its main direction, can be reduced. This allows the bandwidth and thus the quickness of the modulator to be significantly increased. This also allows the control electronics to be simplified by using a single contact that is faster and simpler than a "traveling wave" contact for which differences in optical and electrical delays over a plurality of portions must be managed, for example.

Moreover, since the amount of overlapping is improved, it is not necessary to highly dope the P and N zones, thus reducing the optical losses.

Moreover, the solutions of the prior art mentioned above are not well suited to phase modulation in a multimode guide. The solution according to the invention allows the phase modulation in a multimode guide to be improved considerably, by voluntarily exciting various modes in this guide in such a way as to obtain a light flow having an optical power distribution according to an oscillating continuous function.

In a preferred and particularly advantageous manner, the oscillating continuous function of the PN junction is defined in such a way that the ZCE covers at least X % of the oscillating continuous function of the light flow between the input and the output of the modulation guide, with X≥50, preferably X≥60, preferably X≥70, preferably X≥80, preferably X≥90.

Moreover, the modulator according to the invention can have a width, i.e., a dimension in a direction perpendicular to the main direction, that remains limited. This small width contributes to reducing the time for the carriers to cross the PN Junction. Finally, this allows the quickness of the modulator to be improved even more.

For a light flow having a wavelength λ, the superposition of the various modes of propagation means that $P_{flux} \geq \lambda$.

Thus, in order to obtain good overlapping X between the oscillating continuous function of the PN junction and the oscillating continuous function of the light flow, $P_{jPN}$ is chosen such that $P_{jPN} \geq \lambda$.

The dimensional constraints associated with creating such a PN junction are advantageously relaxed and sufficiently low, in such a way that the creation of the PN junction can be carried out with the conventional techniques of lithography. The modulator according to the invention can thus be obtained in an easy, reproducible and not very costly way.

Starting from a solution such as that taught by the document Optical Express volume 19, issue 12, no 11507 (2011) mentioned above, a person skilled in the art would at best be incited to increase the width of the depleted zone $W_{ZCE}$ extending perpendicularly to the main direction of propagation of the light wave in a multimode guide.

This solution leads to a bandwidth and a compactness that are relatively limited.

Optionally, the invention can further have at least one of the following features:

Advantageously, the oscillating continuous function is periodic, having a period $P_{jPN}$.

Preferably, said function is sinusoidal or triangular.

Alternatively, the oscillating continuous function is quasi-periodic. Preferably, said function is obtained by summing, in series, sinusoidal or triangular functions.

Alternatively, the oscillating continuous function comprises a damping factor over its period, in such a way that said function has a pseudo-period. The pseudo-period preferably increases between the input of the modulation guide and the output of the modulation guide.

These features allow the spatial distribution of the ZCE to be adapted, alternatively or in combination, according to the nature and the power distribution of the optical signal to be modulated, in such a way as to optimize the amount of overlapping.

A second aspect of the present invention relates to a switch comprising at least two output guides and a phase modulator according to the first aspect of the invention, the output of the phase modulator being optically coupled with the inputs of the output guides.

A third aspect of the present invention relates to an intensity modulator comprising at least one phase modulator according to the first aspect of the invention and an output guide. This phase modulator further comprises a first guide segment configured to optically couple the output of the input guide to the input of the modulation guide. This first guide segment is further configured to optically couple the output of the modulation guide to an input of the output guide.

The intensity modulator farther comprises a second guide segment extending from the output of the input guide of the phase modulator to the input of the output guide.

Such an intensity modulator can be of the Mach-Zehnder type in particular.

The modulator according to the invention can advantageously be provided in a modulator or a switch in the field of telecommunications.

BRIEF DESCRIPTION OF THE DRAWINGS

The goals, objects, features and advantages of the invention will be clearer from the detailed description of embodiments of the latter that are illustrated by the following accompanying drawings in which.

Figure 1A:
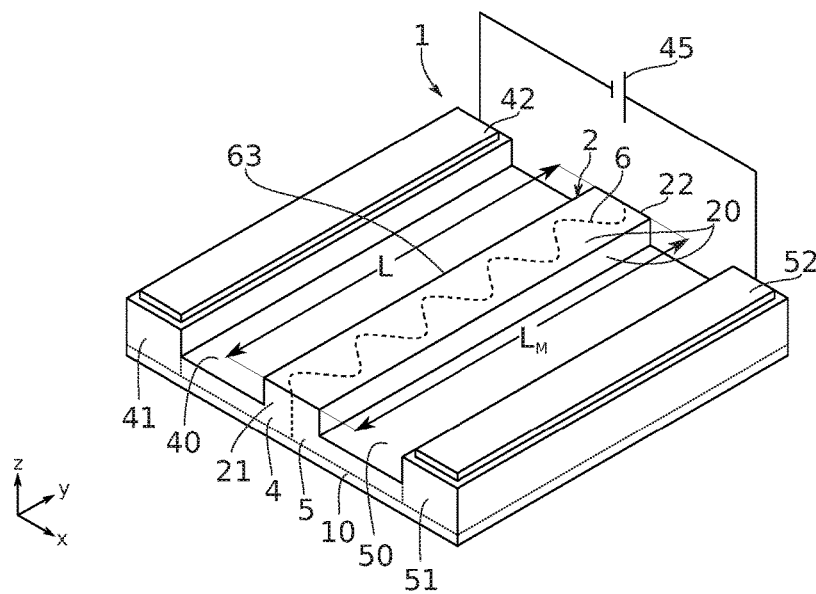
FIG. 1a is a perspective view of a phase modulator according to one embodiment of the present invention.

The drawings are given as examples and are not limiting to the invention. They are schematic representations of a principle, intended to facilitate the understanding of the invention, and are not necessarily on the scale of the practical applications. In particular, the thicknesses and dimensions of the various layers and portions of the modulators illustrated are not representative of reality.

DETAILED DESCRIPTION OF THE INVENTION

Before starting a detailed review of embodiments of the invention, optional features that can optionally be used in combination or alternatively are mentioned below:

the oscillating continuous function is defined in such a way that the PN junction covers at least X % of the fight flow between the input and the output of the modulation guide, with X≥50, preferably X≥60, preferably X≥70, preferably X≥80, preferably X≥90.

the oscillating continuous function forms oscillations each defining a crest and the crests of two successive oscillations are separated by a distance $P_{jPN}P_{jPN}$ can thus be qualified as a peak-to-peak distance in the case in which the crests form peaks.

the distance $P_{jPN}$ corresponds to the shortest distance between two successive crests taken from all of the crests formed by the PN junction along the modulation guide. Preferably, $P_{jPN}$ is such that $P_{jPN} \geq 300$ nm, preferably $P_{jPN} \geq 750$ nm, and preferably $P_{jPN} \geq 1$ μm. This distance $P_{jPN}$ can be measured regardless of whether the function is periodic or non-periodic, with a constant or non-constant period over the length of the modulation guide.

said continuous function is periodic, having a period $P_{jPN}$. Thus, according to this embodiment, the distance $P_{jPN}$ between two successive crests is equal to the period of the oscillations.

said continuous function is sinusoidal.

said continuous function is triangular.

the input guide is configured in order for the light flow propagating in the modulation guide to have an oscillating power distribution and this distribution to oscillate periodically according to a period $P_{flux}$ in the modulation guide.

the power distribution of the light flow propagating through the modulation guide oscillates periodically according to a period $P_{fluxE}$ at the input of said guide and the PN junction is configured in such a way as to satisfy the following formula:

$$k_1 \cdot P_{fluxE} \leq P_{jPN} \leq k_2 \cdot P_{fluxE}$$

with $k_1=0.5$ and $k_2=2$, preferably $k_1=0.7$ and $k_2=1.5$, preferably $k_1=0.8$ and $k_2=1.2$, preferably $k_1=0.9$ and $k_2=1.1$, and preferably $k_1=0.95$ and $k_2=1.05$.

the period $P_{fluxS}(V)$ of the power distribution of the light flow at the output of the guide is dependent on the voltage V, with V varying between $V_{min}$ and $V_{max}$ during operation, and the PN junction is configured in such a way as to verify the following formula:

$$k_3 \cdot P_{FluxS} \leq P_{jPN} \leq k_4 \cdot P_{FluxS}$$

with $k_3=0.5$ and $k_4=2$, for any value of V between $V_{min}$ and $V_{max}$.

$V_{min}=0$ Volts and $|V_{max}| \leq 8V$, preferably $|V_{max}| \leq 5V$ and preferably $|V_{max}| \leq 2.5V$.

the modulation guide has an input and an output and $P_{jPN}$ is substantially, preferably strictly constant along the main axis (y) of propagation between the input and the output of the modulation guide.

the modulation guide has an input and an output and $P_{jPN}$ varies along the main axis (y) of propagation between a period $P_{jPNE}$ at the input of a modulation portion of the modulation guide and a period $P_{jPNS}$ at the output of said modulation portion of the modulation guide, such that:

$$l_1 \cdot P_{jPNS} \leq P_{jPNE} \leq l_2 \cdot P_{jPNS}$$

with $l_1=0.8$ and $l_2=1.2$, preferably $l_1=0.9$ and $l_2=1.1$, and preferably $l_1=0.95$ and $l_2=1.05$.

$P_{jPN} \geq 300$ nm, preferably $P_{jPN} \geq 750$ nm, and preferably $P_{jPN} \geq 1$ μm.

the modulation guide is a muitimode guide, preferably dual mode.

the modulator comprises an input guide having an output optically coupled to the modulation guide.

the input guide is configured to excite various propagation modes in the modulation guide.

the input guide is a single-mode guide having an axis of propagation not aligned with the main axis (y) of propagation of the modulation guide.

the input guide is an output of a mode converter.

the modulator is configured for a light wave having a wavelength λ between 700 nm and 3000 nm, and preferably 1530 nm≤λ≤1585 nm ("C" band) or 1260 nm≤λ≤1360 nm ("O" band).

the modulator is configured for a light wave having a wavelength λ, and said oscillating continuous function of the PN junction is periodic with a period $R_{jPN}$ such that $P_{jPN} \geq \lambda$.

the input guide is a multimode guide simultaneously guiding various propagation modes of the light flow.

the doping of the P+ zone is less than $10^{18}$ cm$^{-3}$, preferably approximately $10^{17}$ cm$^{-3}$.

the doping of the N+ zone is less than $2.10^{18}$ cm$^{-3}$, preferably approximately $2.10^{17}$ cm$^{-3}$.

In order to determine the trajectory and the position of a light flow propagating in the modulation guide, a simulation can be carried out. For this, the following can for example be used:

methods for calculating finite differences in the time domain (FDTD for the acronym Finite Difference Time Domain). The software Rsoft and Lumerical for example allows these calculations to be earned out.

finite-elements methods (FEM for the acronym Finite Elements Method). The software Comsol for example allows such a method to be used.

beam-propagation methods (BPM for the acronym Beam Propagation Method). The software Rsoft for example allows such a method to be used In order to measure the amount of overlapping X between the space charge region and the light flow, the following procedure is used:

The space charge region has spatial distributions of concentrations of free carriers, electrons and holes, respectively noted as $\Delta N_e(x,y,z)$ and $\Delta N_h(x,y,z)$, where y is the direction of propagation of the light.

These distributions of concentrations of carriers generate local modifications of the core index $n_c$, which is dependent on the material and on the wavelength. For silicon, around λ=1.55 μm for example, the following relationship exists:

$$\Delta n_c(x,y,z) = -8.8.10^{-22} \cdot \Delta N_e(x,y,z) - 8.5.10^{-18} \cdot (\Delta N_h(x,y,z))^{0.8}$$

The amount of overlapping X of the ZCE can thus be expressed by the electromagnetic field $E(x,y,z)$ of the light wave, by integrating over the cross-section S of the optical mode or of the superimposed optical modes in such a way that:

$$X = \frac{\iint_S |\Delta n_c(x,y,z)| |E(x,y,z)|^2 \, dxdz}{\iint_S |\Delta n_c(x,y,z)| \, dxdz \cdot \iint_S |E(x,y,z)|^2 \, dxdz}$$

Conventionally, that is to say, in the mathematical sense of the term, a function is a relationship between a set of inputs and a set of outputs, with the property that each input is linked to exactly one output.

In this sense, a distribution or a rectangular signal is not a function.

Moreover, the continuity of a function is associated with the notion of continuum, the origin of which is geometric. The real functions defined over an interval and having a graph that can be traced without picking up the pencil are continuous.

Thus, a sinusoidal function or a triangular function is continuous.

However, a function that has "jumps" is discontinuous.

In particular, a Heaviside function is not continuous.

Hereinafter, an oscillating function means a function that is alternatively increasing and decreasing. An oscillating function can be periodic or non-periodic.

In the present invention, modes for guiding a light wave will be indicated. A light wave is an electromagnetic wave comprising an oscillating electric field coupled with an oscillating magnetic field. When the light wave is confined in a waveguide or an optical fibre for example, it propagates according to various modes called transverse modes (because of the conditions at the limits imposed by the confinement), including:

the TE modes (Transverse Electric according to the acronym) not having an electric field in the direction of propagation. The corresponding fundamental mode is noted as TE00, the corresponding secondary modes are noted as TE01, TE10, TE11, TE02, TE12 etc.

the TM modes (Transverse Magnetic according to the acronym) not having a magnetic field in the direction of propagation. The corresponding fundamental mode is noted as TM00, the corresponding secondary modes are noted as TM01, TM10, TM11, TM02, TM12 etc.

The light flow corresponds here to the power distribution resulting from the propagation modes, of the lightwave, excited in the modulation guide. In particular, the period of the light flow is different from the wavelength of the light wave.

In the present invention, types of doping will be indicated. These dopings are non-limiting examples. The invention covers all the embodiments in which the dopings are inverted. Thus, if an embodiment mentions P doping for a first zone and N doping for a second zone, the present description thus describes, at feast implicitly, the inverse example in which the first zone has N doping and the second zone P doping.

Conventionally, doping noted as P+ (respectively N+) means that this is P-type doping (respectively N-type doping) having a concentration of doping species that is greater than or equal to 1 atom of the doping species for less than 100000 atoms of the semiconductor. A doping noted as P++ (respectively N++) is a P-type doping (respectively N-type) having a concentration of doping species that is greater than or equal to 1 atom of the doping species for less than 1000 to 10000 atoms of the material forming the semiconductor layer.

A first embodiment of a phase modulator according to the invention will now be described in reference to FIGS. 1a, 2a, 2b and 3.

As illustrated in FIG. 1a, the modulator 1 comprises at least one modulation guide 2 configured to guide at least one optical mode of a light wave, preferably two, and modulate the phase of this guided wave.

Without this being limiting, the modulation guide 2 can be for example a rib-shaped guide and have a width dimension W along the axis x between 200 nm and 3 µm, a height dimension h along the axis z between 100 nm and 600 nm, preferably between 150 nm and 350 nm, and a length dimension L along the main axis of propagation (y) between 20 µm and 4000 µm, preferably between 50 µm and 500 µm.

A height h' of the rib, formed for example by partial etching, can be such that: h'=h/2 or h'=h/5 for example.

These dimensions are preferably compatible with multimode guiding of the light wave, in particular for h=300 nm, h'=150 nm, and W>450 nm.

The modulation guide 2 is preferably a multimode guide, and preferably a dual-mode guide.

It is preferably made of a semiconductor material having a contrast with the surrounding medium in terms of refractive index, in such a way as to confine the light wave in the guide. Hereinafter, the contrast in refractive index is simply called index contrast.

The modulation guide 2 is preferably made of silicon.

According to one possibility, the guide 2 can be made of germanium.

It can be formed via at least one step of lithography and at least one step of etching for example, on a substrate 10. Preferably, the substrate 10 is also made of silicon.

The modulation guide 2 comprises an input 1 and an output 22 through which the light wave enters and exits.

It can preferably have a section called "rib-shaped section" (also called RIB) in the plane (xz) of the reference frame illustrated in the drawings.

It can further have one or more surfaces 20 encapsulated by silica for example.

The modulation guide 2 comprises at least one modulation portion 63 having a length $L_M$ along (y), said portion 63 comprising a PN junction 6.

This modulation portion 83 can extend over the entirety of the modulation guide 2 from the input 21 to the output 22, in such a way that the length $L_M$ of the modulation portion is equal to the length L of the modulation guide.

The length L of the modulation guide is measured in the main direction (y) between the input 21 and the output 22.

Figure 1B:
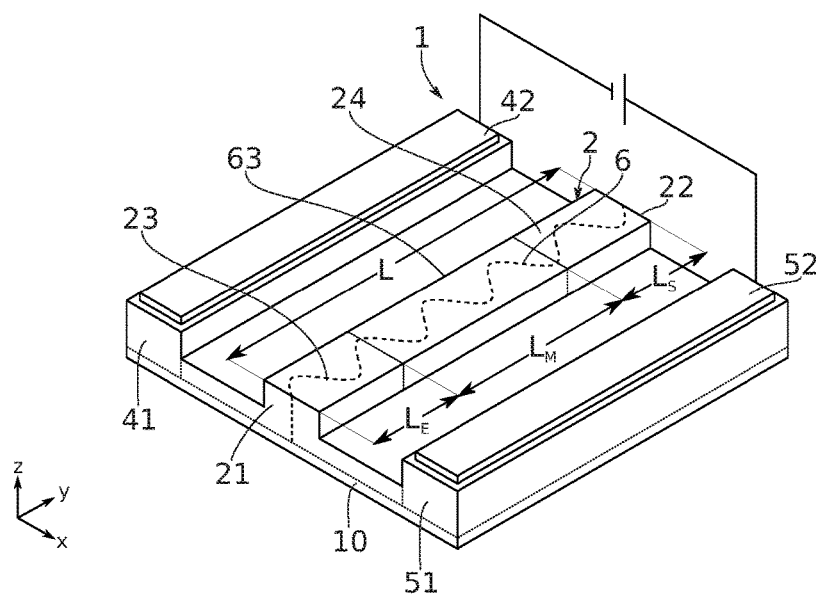
FIG. 1b is a perspective view of a phase modulator according to another embodiment of the present invention.

Alternatively, as illustrated in FIG. 1b, this modulation portion 63 follows an input portion 23 of the modulation guide, said input portion 23 extending from the input 21 in the main direction (y), over a distance $L_E$ less than or equal to n times the length L of the modulation guide 2. Preferably, n is equal to 0.2, preferably n is equal to 0.1, preferably n is equal to 0.05, and preferably n is equal to 0.01.

Similarly, an output portion 24 having a length $L_S$ ($L_S \leq n \cdot L$) can also follow the modulation portion 63, said output portion 24 extending from the end of the modulation portion 63 to the output 22 of the modulation guide 2.

The PN junction 6 is preferably an interface between a P+ doped zone 4 and an N+ doped zone 5. For example, the doping of these N+ and P+ zones 5, 4 can be carried out via ion implantation in a direction parallel to the axis (z). The PN junction 6 can thus extend in parallel to (z) over a depth d, taken along the axis (z), preferably between 200 m and 500 nm.

The PN junction 6 also extends in (x) and in (y) (and thus in the plane xy) according to a curve of a continuous function.

Preferably, the main dimension of the PN junction 6 is parallel to the axis (y) of propagation of the light wave.

Advantageously, the PN junction 6 at least partially coincides with a light flow 3 associated with the light wave propagating inside the modulation guide 2, in such a way as to interact with said light flow 3.

The propagation of the light wave in the modulation guide 2 comprises at least one fundamental mode TE00, and can comprise secondary modes.

The input guide 210 and the modulation guide 2 are configured in such a way that the light flow 3 propagating in the modulation guide 2 results from a superposition of various excited modes.

The secondary modes can be excited in the modulation guide 2, for example via an input guide 210 offset with respect to the main axis of propagation (y) of the modulation guide 2, or excited upstream of the modulation guide 2, that is to say, before the light flow 3 propagates in the modulation guide 2.

The various excited modes propagating simultaneously in the modulation guide 2 preferably comprise symmetric and antisymmetric modes. For example, the input guide 210 and the modulation guide 2 are configured in such a way that two modes propagate simultaneously in the modulation guide 2, one being symmetric and the other being antisymmetric.

Thus, the excited modes propagating simultaneously in the modulation guide 2 are superimposed in such a way as to form a light flow 3 having an oscillating optical power distribution in the modulation guide 2.

The successive oscillations of this power distribution are separated from each other by a distance $P_{flux}$.

In particular, the optical power distribution of the guided modes TE00 and TE01 propagating along the main axis (y) have periodic oscillations having a period $P_{flux}$ along said axis (y). All the explanations that follow and that refer to the guided modes TE00 and TE01 also apply to the guided modes TM00 and TM01.

The period of the oscillation $P_{flux}$ is such that:

$$P_{flux} = \lambda/(n_{eff1} - n_{eff2}): \quad (1)$$

where $n_{eff1}$ is the effective index associated with the fundamental mode and $f_{eff2}$ is the effective index associated with the secondary mode, furthermore satisfying $n_{eff1} > n_{eff2}$.

The fundamental and secondary mode of propagation are partially dependent on the geometry of the guide 2. The effective indices associated with these propagation modes are dependent in fine on the geometry of the guide 2, and are in particular a function of the width W of the guide 2.

The table below compiles results of finite-element modelling from the software Rsoft, for various widths W of the modulation guide 2:

|  | W = 0.6 μm | W = 0.7 μm | W = 0.8 μm | W = 0.9 μm |
|---|---|---|---|---|
| $n_{eff1}$ | 3.061 | 3.082 | 3.098 | 3.110 |
| $n_{eff2}$ | 2.799 | 2.856 | 2.906 | 2.946 |
| $P_{flux}$ | 5 μm | 5.8 μm | 6.8 μm | 8 μm |

The PN junction 6 is thus advantageously defined by the curve of an oscillating continuous function in the plane (xy).

Thus, the P+ doped zone 4 and the N+ doped zone 5 are advantageously interdigital in the modulation guide 2.

The function that defines the shape of the PN junction can in particular be periodic with a period $P_{jPN}$, such that:

$$k_1 \cdot P_{flux} \leq P_{jPN} \leq k_2 \cdot P_{flux}: \quad (2)$$

with $k_1 = 0.5$ and $k_2 = 2$, preferably $k_1 = 0.7$ and $k_2 = 1.5$, preferably $k_1 = 0.8$ and $k_2 = 1.2$, preferably $k_1 = 0.9$ and $k_2 = 1.1$, and preferably $k_1 = 0.95$ and $k_2 = 1.05$.

This period $P_{jPN}$ can be an average period or a pseudo-period over the length $L_M$ of the modulation portion 63.

Figure 3A:
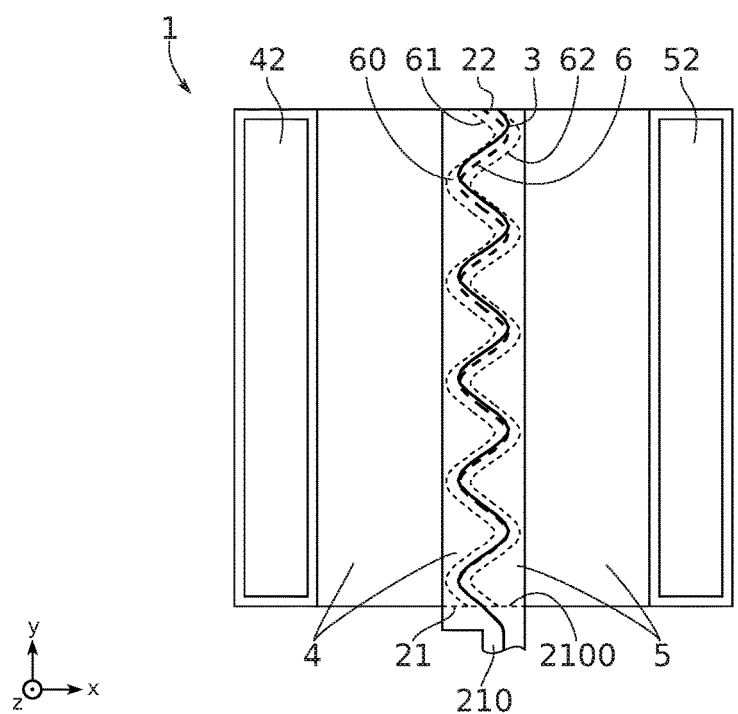
FIG. 3a is a top view of the phase modulator illustrated in FIG. 1a, coupled with an input guide, this view also illustrating a distribution of the light flow guided in the modulator.

As illustrated in FIG. 3a, said function can advantageously be sinusoidal, in such a way that the PN junction 6 has a good correspondence with the power distribution of the light flow 4 in the modulation guide 2.

Alternatively, said function can be triangular.

According to an embodiment that is only optional, the period $P_{jPN}$ can be substantially, preferably strictly constant along the main axis (y) of propagation over the modulation portion 63 of the modulation guide 2.

In particular, the period $P_{jPN}$ can be greater than 300 nm, preferably $P_{jPN} \geq 750$ nm, and preferably $P_{jPN} \geq 1$ μm.

The modulator 1 can in particular be configured for a light wave having a wavelength λ between 700 nm and 3000 nm, and preferably 1530 nm ≤ λ ≤ 1585 nm ("C" band) or 1260 nm ≤ λ ≤ 1360 nm ("O" band).

Thus, the periodic continuous function having a period $P_{jPN}$ defining the PN junction 6 can be such that $P_{jPN} \geq \lambda$.

The dimensional constraints associated with the creation of such a PN junction 6 having a period $P_{jPN}$ are not strong.

The creation of this PN junction 6 can thus be perfectly carried out with the conventional optical lithography techniques. The modulator 1 according to the invention can thus be obtained in an easy, reproducible and not very costly manner.

Figure 2A:
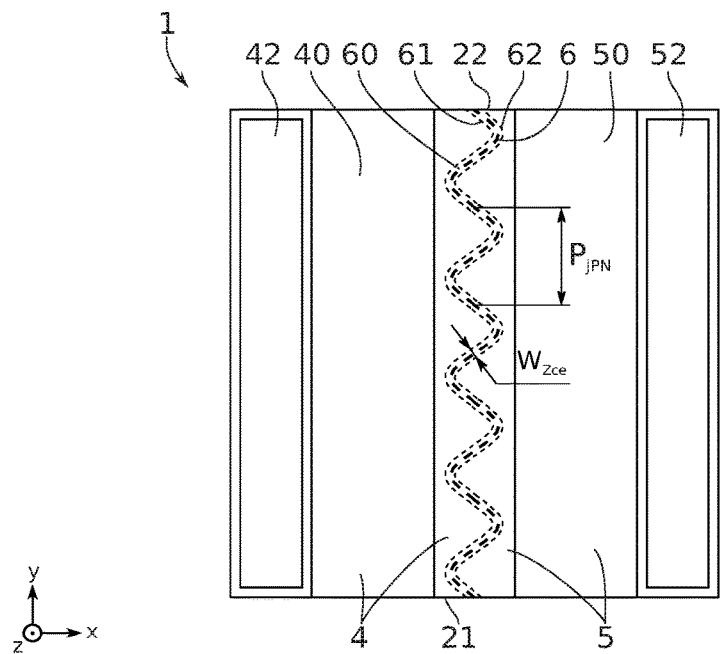
FIG. 2a is a top view of the phase modulator illustrated in FIG. 1a and showing a first space charge region.
Figure 2B:
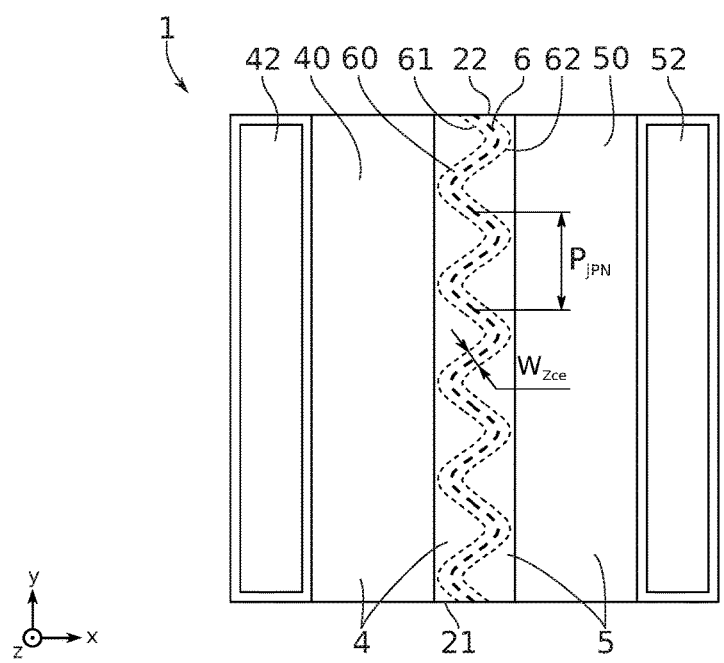
FIG. 2b is a top view of the phase modulator illustrated in FIG. 1a and showing a second space charge region.

As illustrated in FIGS. 2a and 2b, at the PN junction 6, a space charge region, noted as ZCE 60 hereinafter, extends on either side of the PN junction in a direction orthogonal to the direction tangent to the curve defining the PN junction 6.

The ZCE 60 has a limit, also called border 61, at the P+ doped zone 4, and a border 62 at the N+ doped zone 5. The ZCE 60 is defined by the borders 61, 62.

The ZCE 60 thus has a width $W_{ZCE}$, preferably taken in a direction orthogonal to the direction tangent to the curve defining the PN junction 6, i.e. to the curves formed by the borders 61, 62. The widths $W_{ZCE}$ of two different ZCE 60s are referenced in FIGS. 2a and 2b.

This space charge region is depleted of charge carriers.

The depletion spatially modifies distributions of concentrations of free carriers, electrons and holes, respectively noted as $\Delta N_e(x,y,z)$ and $\Delta N_h(x,y,z)$.

These distributions of concentrations of carriers generate local modifications of the core index $n_c$.

The variation in core index $\Delta n_c(x,y,z)$ is dependent on the material and on the wavelength λ of the light wave propagating in the guide 2.

Silicon and λ = 1.55 μm for example give the following relationship:

$$\Delta n_c(x,y,z) = -8.8 \cdot 10^{-22} \cdot \Delta N_e(x,y,z) - 8.5 \cdot 10^{-18} \cdot (\Delta N_h(x,y,z))^{0.8}$$

The variation in effective index at a position y on the axis (y) of propagation of the light wave can thus be deduced through integration over the section S of the optical mode of propagation of the light flow 3:

$$\Delta n_{eff}(z) = \frac{\int\int_S \Delta n_c(x,y,z) |E(x,y,z)|^2 \, dxdz}{\int\int_S |E(x,y,z)|^2 \, dxdz} \quad (3)$$

E(x,y,z) being the electric component of the electromagnetic field of the light wave.

The phase shift of the light over a length $L_M$ of propagation is thus written as:

$$\Delta\varphi = k_0 \int_0^{L_N} \Delta n_{eff}(y) \cdot dy \quad (4a)$$

Or:

$$\Delta\varphi = k_0 \int_0^{L_N} \left[ \frac{\int\int_S \Delta n_c(x,y,z) |E(x,y,z)|^2 \, dxdz}{\int\int_S |E(x,y,z)|^2 \, dxdz} \right] \cdot dy \quad (4b)$$

If the depletion is periodic, and the light wave travels for N periods over a length L, this integral can be expressed through one period:

$$\Delta\varphi = k_0 N \int_0^P \left[ \frac{\int\int_S \Delta n_c(x,y,z) |E(x,y,z)|^2 \, dxdz}{\int\int_S |E(x,y,z)|^2 \, dxdz} \right] \cdot dy$$

:(4c)

Moreover, the level of coverage X of the ZCE 60 by the Sight flow 3 can be expressed as:

$$X = \frac{\iint_s |\Delta n_c(x, y, z)| |E(x, y, z)|^2 \, dxdz}{\iint_s |\Delta n_c(x, y, z)| \, dxdz, \iint_s |E(x, y, z)|^2 \, dxdz} \quad (5)$$

The phase shift $\Delta\varphi$—on which the principle of phase modulation of the modulator 1 is based—is therefore in particular proportional to the amount of overlapping X between the light flow 3 and the ZCE 60.

Advantageously, the ZCE 60 is configured to cover the guided modes of the light wave in an optimal manner, in such a way as to obtain an efficient phase shift of the light wave propagating in the modulation guide 2.

FIG. 3a illustrates an embodiment in which the ZCE 60 covers almost all of the light flow 3.

In particular, the function defining the PN junction 8, and by extension the ZCE 60, is configured to have an amount of overlapping X with the light flow 3 between the input 21 and the output 22 of the modulation guide 2, with X≥50%, preferably X≥60%, preferably X≥70%, preferably X≥80%, preferably X≥90%.

This correspondence between the power distribution of the light flow 3, that is to say, the position of the light flow 3 in the modulation guide 2, and that of the ZCE 60 along the main axis of propagation makes the phase shift particularly efficient.

The light wave undergoes a phase shift via phase accumulation, in such a way that the corresponding light flow 3 has a period $P_{FluxE}$ at the input 21 of the modulation guide 2, at least partly on the input portion 23, and a period $P_{fluxS}$ at the output 22 of the modulation guide 2, at least partly on the output portion 24.

The phase shift can preferably be such that $P_{fluxE} < P_{fluxS}$.

In order to compensate a progressive offset of the fight flow 3 caused by the cumulative nature of the phase shift, the oscillating continuous function defining the PN junction 6 can have a period $P_{jPN}$ that varies along the main axis (y) of propagation between a period $P_{jPNE}$ at the input of the modulation portion 63 and a period $P_{jPNS}$ at the output of the modulation portion 63, such that:

$$l_1 \cdot P_{jPNS} \leq P_{jPNE} \leq l_2 \cdot P_{jPNS}: \quad (6)$$

with $l_1 = 0.8$ and $l_2 = 1.2$, preferably $l_1 = 0.9$ and $l_2 = 1.1$, and preferably $l_1 = 0.95$ and $l_2 = 1.05$.

The amount of overlapping X is thus advantageously increased.

Moreover, since the amount of overlapping is increased, the length L of the guide, in its main direction, can be reduced. This compactness allows the bandwidth of the modulator 1 to be significantly increased by limiting the optical losses on the path of the light flow 3.

The amount of overlapping can also vary according to the width $W_{ZCE}$ of the ZCE 60.

The width of the ZCE 60 can be increased by applying an electric voltage V between the N+ and P+ doped zones, by reducing the concentrations of dopants $N_A$ and $N_D$, or by a combination of these possibilities.

The concentration of dopants $N_A$ in the P+ zone 4 is advantageously less than $10^{18}$ cm$^{-3}$, preferably approximately $10^{17}$ cm$^{-3}$. The concentration of dopants $N_D$ in the N+ zone 5 is advantageously less than $2.10^{18}$ cm$^{-3}$, preferably approximately $2.10^{17}$ cm$^{-3}$.

These relatively low concentrations of dopants further allow the optical losses to be limited, and contribute to improving the bandwidth of the modulator 1.

FIGS. 2a and 2b illustrate the same phase modulator. The ZCE 60 of the phase modulator, illustrated in FIG. 2a, has a width $W_{ZCE}$ significantly smaller than the width $W_{ZCE}$ of the ZCE 60 of the phase modulator illustrated in FIG. 2b.

In order to compensate for a possible decentring of the ZCE 80 with respect to the PN junction 6 caused for example by the difference in effective doping between the P+ zone and the N+ zone 4, 5, the oscillating continuous function defining the PN junction 6 can advantageously have a main axis along (y) that is off centre, in a projection in the plane (xy), with respect to the central longitudinal axis of the modulation guide 2, and parallel to the latter.

The phase shift $\Delta\varphi$ can also be modulated by applying the electric voltage V.

Advantageously, the modulator 1 comprises a device 45 configured to apply such a variable voltage V between the N+ and P+ doped zones 5, 4. This voltage varies during operation preferably between and $V_{min}$ and $V_{max}$ with $V_{min} = 0$ Volts and $|V_{max}| \leq 8V$, preferably $|V_{max}| \leq 5V$ and preferably $|V_{max}| \leq 25V$.

In particular, $V_{min}$ and $V_{max}$ can be adapted according to the use for example, or for a wavelength $\lambda$ or a particular band of wavelengths.

$V_{max}$ can in particular correspond to the half-wave voltage $V_\pi$ allowing a phase variation of $\pi$ to be induced in the light wave at the output 22 of the modulator.

Since the period of the light flow 3 at the output 22 of the guide is proportional to the phase shift $\Delta\varphi$, it is also dependent on the voltage V and the PN junction 6 should be configured in such a way that:

$$k_3 \cdot P_{FluxS}(\Gamma, V) \leq P_{jPN} \leq k_4 \cdot P_{FluxS}(\Gamma, V): \quad (7)$$

with $k_3 = 0.05$ and $k_4 = 2$, for any value of V between $V_{min}$ and $V_{max}$.

The modulator 1 comprises zones of contacts 42, 52, intended to connect said device 45 to the N+ and P+ zones. In the N+ zone 5, and respectively the P+ zone 4, the contact zone comprises at least one metal layer deposited on an N++ doped zone 51, and respectively on a P++ doped zone 41.

The metal layer(s) can comprise copper, titanium, aluminium, nickel, chromium in the form of a pure element or in an alloy. At least one intermediate layer (for example between the zones 41, 51 and the contacts 42, 52, respectively) can exist in order to reduce the resistance of the contacts, such a layer preferably being a Nickel-Silicon alloy, which is called siliconisation, Siliconisation is widely known in particular from MOS technologies.

The doping of the N++ and P++ zones can be greater than $10^{19}$ cm$^{-3}$ in such a way as to ensure a low access resistance and good electric transport of the charges to the N+ and P+ zones. The N++ zone 51, and respectively the P++ zone 41, has a continuity with the M+ zone 5, and respectively the P+ zone 4.

Advantageously, the surfaces of the M++ and P++ zones, and the free surface 20 of the modulation guide 2 can be in the same plane, in such a way as to limit the steps of the manufacturing method, in particular the steps of lithography.

The N++ and P++ zones can thus have a step with respect to the respective portions 50, 40 of the N+ and P+ zones insulating the modulation guide 2. The step can advantageously have a height h' along the axis z in a similar way as the height h' of the modulation guide 2.

The contact zones are preferably parallel to the modulation guide 2, spaced apart from said guide by a distance along the axis (x) between 1 µm and 20 µm, preferably between 5 µm and 15 µm, and preferably between 1 µm and 3 µm.

This small distance contributes to reducing the time it takes for the carriers to cross the PN junction 6 and allows the quickness of the modulator 1 to be improved.

According to one possibility, the zones of contacts 42, 52 can comprise a plurality of independent contact portions.

The modulator 1 can further comprise an input guide 210 having an output 2100 optically coupled with the modulation guide 2, This coupling can be direct or evanescent.

Said input guide 210 can preferably be a single-mode guide having an axis of propagation offset, in a projection in the plane (xy), with respect to the main axis (y) of propagation of the modulation guide 2.

This decentring allows the appearance of a plurality of modes in the modulation guide 2 to be promoted. In particular the decentring allows the modes TE00 and TE01 or the modes TM00 and TM01 to be excited, thus resulting in an oscillation of the peak of light intensity.

Alternatively, the input guide 210 can be a multimode guide simultaneously guiding a plurality of excited modes.

According to an advantageous possibility, the input guide 210 can comprise an output of a mode converter.

Figure 3B:
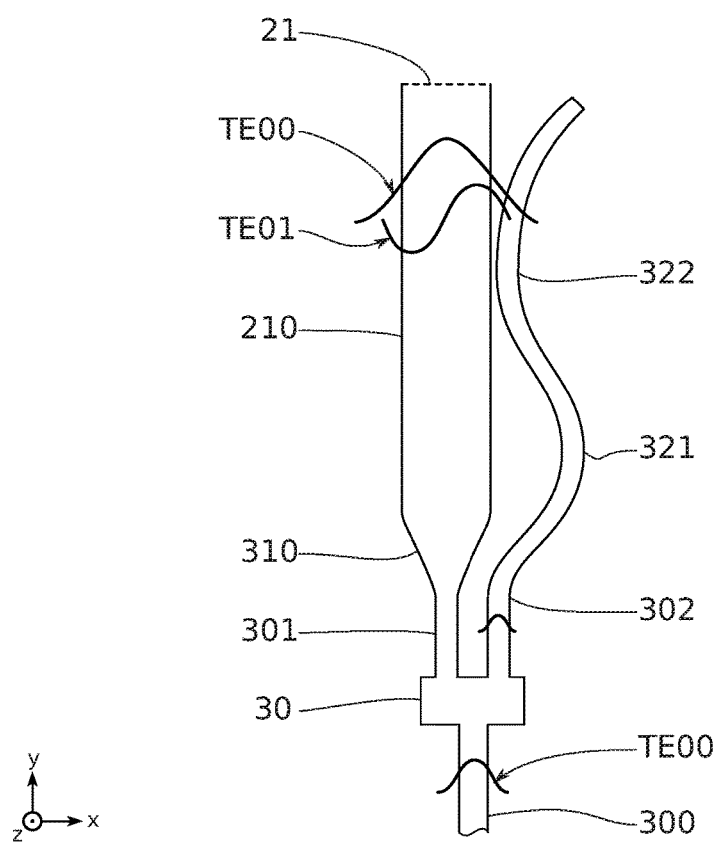
FIG. 3b is a top view of an input guide resulting from a mode converter.

FIG. 3b illustrates an embodiment of a multimode input guide 210 resulting from an output branch of a mode converter.

Such a mode converter configured to form a multimode light flow 3 can use a multiplexing technology, called spatial-division multiplexing, SDM (from the acronym Spatial-Division Multiplexing).

For example, this converter can comprise a power separator or a multimode interference device 30 MMI (acronym for MuitiMode Interference) allowing a first and a second single-mode (for example TE00) light wave propagating in a first and a second single-mode branch 301, 302, respectively, to be generated via spatial division using a single-mode (TE00) input light wave propagating in a single-mode input branch 300.

The first single-mode branch 301 can be enlarged at a portion 301 in such a way as to form the input guide 210 configured to guide and/or hybridize for example two modes of propagation of a light flow.

The first light wave can thus be transmitted in the input guide 210. It preferably propagates via a symmetrical propagation mode.

The dimensioning of this enlarged portion 310 is in particular dependent on the input light wave, the modes to be guided and/or hybridised in the input guide 210, and the effective refractive indices associated with these modes.

The reference "Silicon muitimode photonic integrated devices for on-chip mode-division-multiplexed optical interconnects, D, Dai et al., Progress in Electromagnetics Research, Vol. 143, 773-819, 2013" gives details on various possible dimensionings.

The second single-mode branch 302 preferably has a decoupling portion 321 and a coupling portion 322.

The decoupling portion 321 is configured to prevent undesired reciprocal coupling between the light waves propagating in the input guide 210 and in the second branch 302, at least in the immediate vicinity of the enlarged portion 310. This decoupling portion 321 can be created by increasing the distance of spatial separation between the input guide 210 and the second branch 302.

The coupling portion 322 is configured to transfer, via coupling, at least a portion of the second light wave into the input guide 210, in such a way as to excite for example an antisymmetric propagation mode TE01 of the light flow propagating in the input guide 210, in addition to the symmetric mode TE00.

Such a converter for example allows the formation of a light flow having a dual-mode propagation in the input guide 210. This light flow can then be transmitted at the input 21 of the modulation guide 2.

Other embodiments of a mode converter having a multi-mode branch that can be coupled at the input 21 of the modulation guide 2 of the modulator 1 are described in the reference "Silicon multimode photonic integrated devices for on-chip mode-division-multiplexed optical interconnects, D. Dai et al., Progress In Electromagnetics Research, Vol. 143, 773-819, 2013", for example in FIGS. 25 and 27 of this document.

In reference to FIGS. 4a and 4b, two particularly advantageous uses of the invention will now be described.

Figure 4A:
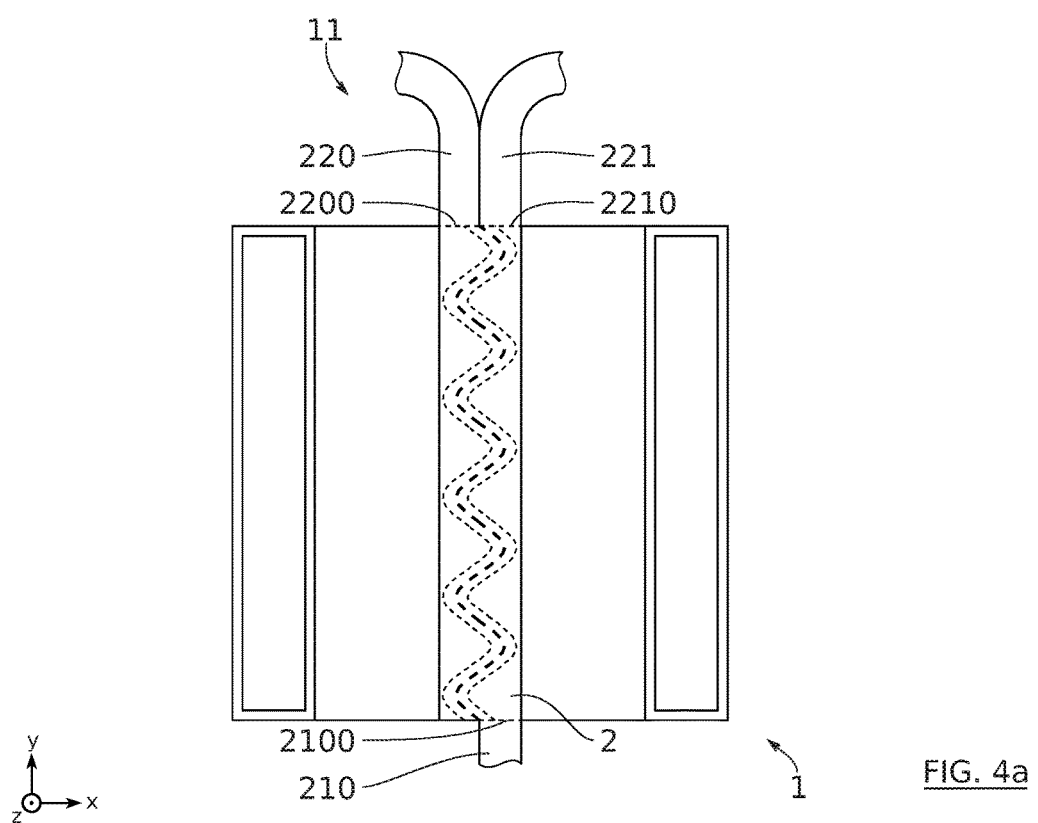
FIG. 4a is a top view of a switch according to one embodiment of the present invention.

FIG. 4a illustrates a switch 11 comprising at least: an input guide 210, at least two output guides 220, 221 and a phase modulator 1 according to the invention.

The input 21 of the phase modulator 1 is preferably optically coupled to an output 2100 of the input guide and the output 22 of the phase modulator 1 is preferably optically coupled to the inputs 2200, 2210 of the output guides 220, 221.

The input guide 210 and output guides 220, 221 are preferably made of silicon and can have at least one free surface.

Their cross-sections can have a surface area two times less than the surface area of the cross-section of the modulation guide 2.

The input guide 210 can preferably be a single-mode guide. Advantageously, it has an axis of propagation offset, in the plane (xy), with respect to the main axis (y) of propagation of the modulation guide 2, in such a way as to promote the appearance of a plurality of modes in the modulation guide 2.

The output guides 220, 221 are preferably adjacent to each other at the coupling with the output 22 of the modulation guide 2. The sum of their respective cross-sections can advantageously be equal to the cross-section of the modulation guide 2.

The output guides 220, 221 can preferably be made of silicon and/or sheathed in order to separate them optically.

According to the voltage V applied to the phase modulator 1, the phase shift obtained promotes the injection of a secondary mode guided in the modulation guide 2 into one or the other of the output guides 220, 221. This arrangement advantageously allows an optical signal to be directed to one or the other of the output guides 220, 221. The switching is advantageously dependent on the quickness of the phase modulator 1 described in the first embodiment.

Figure 4B:
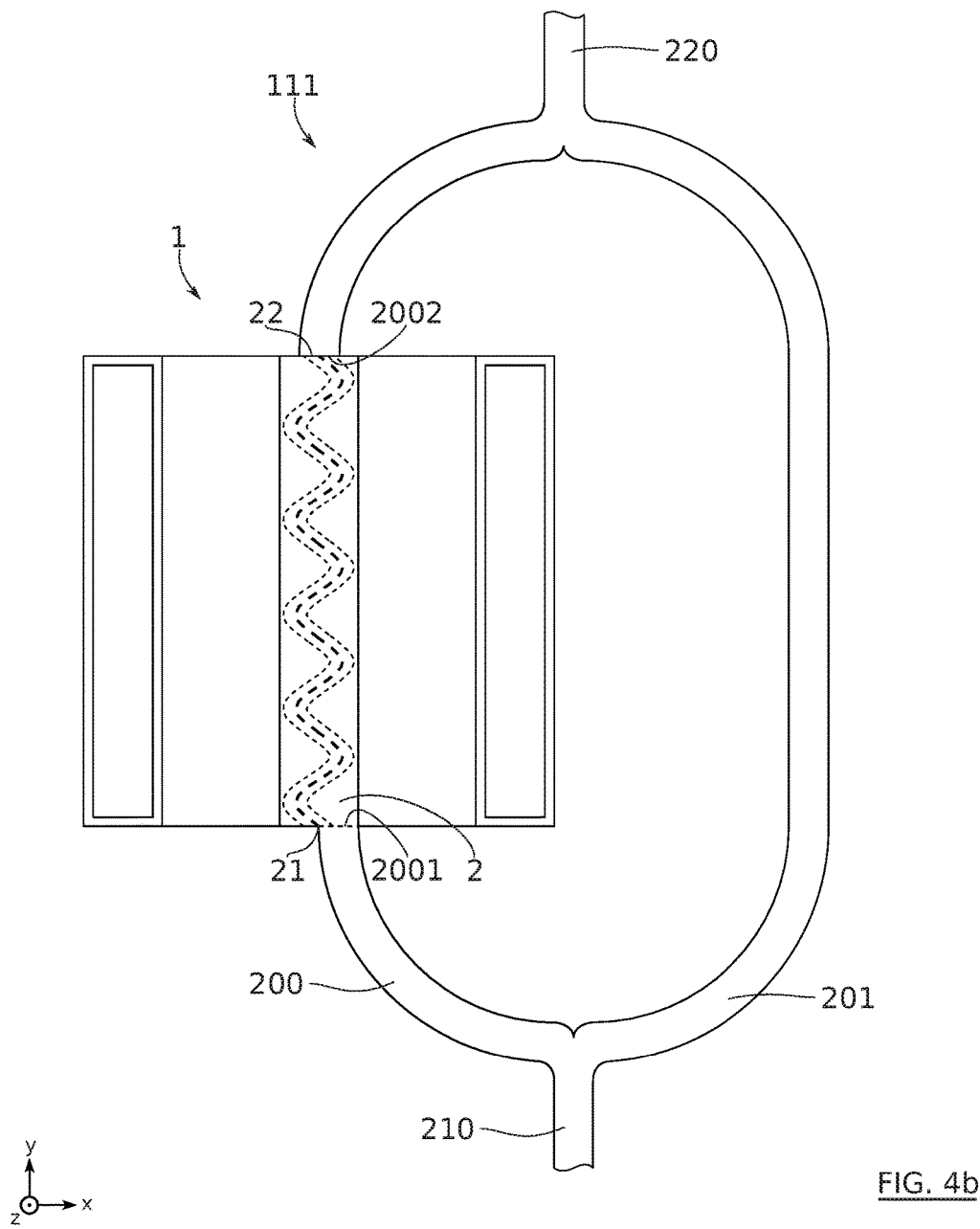
FIG. 4b is a top view of an intensity modulator according to one embodiment of the present invention.

FIG. 4b illustrates an intensity modulator 111 according to the invention. The intensity modulator 111 comprises at least one input guide 210, at least one output guide 220, at least a first and a second guide section 200, 201, also called guide segments, each extending from an output of the input guide to an input of the output guide. The intensity modulator 111 farther comprises at least one phase modulator 1 according to the invention. The phase modulator 1 is positioned on at least one out of the first and second guide segment 200, 201.

The input 21 of the phase modulator 1 is preferably optically coupled to an intermediate output 2001 of the first guide segment 200 for example. The output 22 of the phase modulator 1 is preferably optically coupled to an intermediate input 2002 of the first guide segment 200 for example.

Said first and second segment 200, 201 are preferably made of silicon and can be sheathed, that is to say, surrounded by silica for example.

These guide segments 200, 201 can preferably be single-mode.

The intermediate output 2001 of the first guide segment 200 advantageously has an axis of propagation offset with respect to the main axis (y) of propagation of the modulation guide 2, in such a way as to promote the appearance of a plurality of modes in the modulation guide 2.

Alternatively, one and/or the other of the guide segments 200, 201 can be multimode.

An optical signal entering the intensity modulator 111 can propagate in the first and second guide segment 200, 201 and be recombined in the output guide 220 of the intensity modulator 111.

The portion of the optical signal propagating for example in the first segment 200 comprising the phase modulator 1 undergoes a phase shift with respect to the portion of the signal propagating for example in the second signal 201.

The phase shift can induce interferences during the recombination of the two portions of the signal at the output guide 220, said interference producing a variation in intensity in the optical signal exiting the intensity modulator 111.

Such an intensity modulator 111 can in particular be of the Mach-Zehnder type.

The intensity modulator 111 is advantageously dependent on the compactness of the phase modulator 1 described in the first embodiment.

According to one embodiment, the intensity modulator 111 only comprises a single phase modulator 1 positioned on one of the first and second guide segment 200, 201.

According to an alternative embodiment, the intensity modulator 111 comprises a plurality of phase modulators 1. A phase modulator 1 can thus be positioned on each of the first and second guide segment 200, 201, in such a way that the intensity modulator is configured according to a configuration called "push-pull" configuration for example.

The invention is not limited to the embodiments described above and extends to all the embodiments covered by the claims.

REFERENCES

1. Phase modulator
2. Modulation guide
    20. Free surface
    21. Input of the modulation guide
    22. Output of the modulation guide
        210. Input guide
            2100. Output of the input guide
        220, 221. Output guides
            2200, 2210. Inputs of the output guides
        200, 201. First and second segments
            2001. Intermediate output
            2002. Intermediate input
    23. Input portion of the modulation guide
    24. Output portion of the modulation guide
3. Light flow
4. P-doped zone
    40. Portion of the P-doped zone
    41. P++ doped zone
    42. Electric contact
    45. Voltage device
5. N-doped zone
    50. Portion of the N-doped zone
    51. N++ doped zone
    52. Electric contact
6. PN junction
    60. ZOE
    61. 62. Borders of the ZOE
    63. Modulation portion of the modulation guide

The invention claimed is:

1. A phase modulator for a light flow comprising:
   an input guide and at least one multimode modulation guide having an input optically coupled with an output of the input guide, an output and a main axis (y) of propagation along which a light flow is intended to pass through the at least one multimode modulation guide, the at least one multimode modulation guide further comprising:
   a P-doped zone and a N-doped zone designated in such a way as to define a PN junction generating a space charge region,
   a device configured to vary a voltage V applied between the N-doped and P-doped zones in such a way as to vary a phase of the light flow intended to propagate in the at least one multimode modulation guide,
   wherein the input guide is configured to excite various propagation modes in the at least one multimode modulation guide and in that the PN junction extends mainly along the main axis (y) of propagation, following an oscillating continuous function forming oscillations each defining a crest and in which the crests of two successive oscillations are separated by a distance $P_{jPN}$.

2. The phase modulator according to claim 1, wherein the oscillating continuous function is defined in such a way that the space charge region covers at least X % of the light flow between the input and the output of the at least one multimode modulation guide, with X≥50.

3. The phase modulator according to claim 1, wherein the distance $P_{jPN}$ is such that $P_{jPN} \geq 300$ nm.

4. The phase modulator according to claim 1, wherein the oscillating continuous function is periodic, having a period $P_{jPN}$.

5. The phase modulator according to claim 1 wherein the input guide is configured in order for the light flow propagating in the at least one multimode modulation guide to have a power distribution oscillating in a periodic manner according to a period $P_{flux}$, and the PN junction is configured in such a way as to vary $P_{flux}$ between a value $P_{fluxE}$ at the input of the guide and a value $P_{fluxS}$ at the output of the guide, said period $P_{fluxS}$ being dependent on the voltage V, with V varying between $V_{min}$ and $V_{max}$ during operation, the distance $P_{jPN}$ associated with the PN junction being chosen in such a way that:

$$k_1 \cdot P_{fluxE} \leq P_{jPN} \leq k_2 \cdot P_{fluxE}$$

$$k_3 \cdot P_{FluxS} \leq P_{jPN} \leq k_4 \cdot P_{FluxS}$$

with $k_1=0.5$ and $k_2=2$, and with $k_3=0.5$ and $k_4=2$, for any value of V between $V_{min}$ and $V_{max}$.

6. The phase modulator according to claim 1, wherein the light flow propagates in a dual-mode manner in the at least one multimode modulation guide according to a fundamental mode and a secondary mode and has a wavelength λ and a power distribution oscillating according to a period $P_{flux}$ such that:

$$P_{flux} = \lambda / (n_{eff1} - n_{eff2})$$

where $n_{eff1}$ is an effective index associated with a fundamental mode and $n_{eff2}$ is an effective index associated with a secondary mode, further satisfying $n_{eff2}$.

7. The phase modulator according to claim 5, wherein $V_{min}=0$ Volts and $|V_{max}|\leq 8V$.

8. The phase modulator according to claim 1, wherein the at least one multimode modulation guide has an input and an output and $P_{jPN}$ is constant along the main axis (y) of propagation between the input and the output of the at least one multimode modulation guide.

9. The phase modulator according to claim 1, wherein the oscillating continuous function is periodic, with a period $P_{jPN}$ and wherein the at least one multimode modulation guide has an input and an output and the period $P_{jPN}$ varies along the main axis (y) of propagation between a period $P_{jPNE}$ at the input of the at least one multimode modulation guide and a period $P_{jPNS}$ at the output of the at least one multimode modulation guide, such that:

$$l_1 \cdot P_{jPNS} \leq P_{jPNE} \leq l_2 \cdot P_{jPNS}$$

with $l_1=0.8$ and $l_2=1.2$.

10. The phase modulator according to claim 1, wherein the phase modulator is configured for a light wave having a wavelength $\lambda$, such that $P_{jPN} \leq \lambda$.

11. The phase modulator according to claim 1, wherein the at least one multimode modulation guide is a dual-mode guide.

12. The phase modulator according to claim 1, wherein the input guide is a single-mode guide having an axis of propagation not aligned with the main axis (y) of propagation of the at least one multimode modulation guide.

13. The phase modulator according to claim 1, wherein the input guide is an output of a mode converter.

14. The phase modulator according to claim 1, wherein the phase modulator is configured for a light wave having a wavelength $\lambda$ between 1530 mn$\leq\lambda\leq$1585 nm ("C" band) or 1260 nm$\leq\lambda\leq$1360 nm ("O" band).

15. The phase modulator according to claim 1, wherein a doping of the P-doped zone is less than $10^{18}$ cm$^{-3}$.

16. The phase modulator according to claim 1, wherein a doping of the N-doped zone is less than $2.10^{18}$ cm$^{-3}$.

17. The phase modulator according to claim 1, wherein said oscillating continuous function is sinusoidal.

18. The phase modulator according to claim 1, wherein said oscillating continuous function is triangular.

19. A switch comprising
a phase modulator according to claim 1 and at least two output guides, the output of the at least one multimode modulation guide being optically coupled to inputs of the output guides.

20. An intensity modulator comprising at least:
a phase modulator according to claim 1 and an output guide, the phase modulator further comprising a first guide segment configured to optically couple the output of the input guide to the input of the at least one multimode modulation guide, said first guide segment being further configured to optically couple the output of the at least one multimode modulation guide to an input of the output guide,
a second guide segment extending from the output of the input guide to the input of the output guide.

* * * * *